May 12, 1931. D. W. PERIN 1,804,542

LOCKING MEANS

Filed Nov. 11, 1927 2 Sheets-Sheet 1

Inventor
Donald W. Perin
By Roberts Cushman & Woolberry
Attorneys

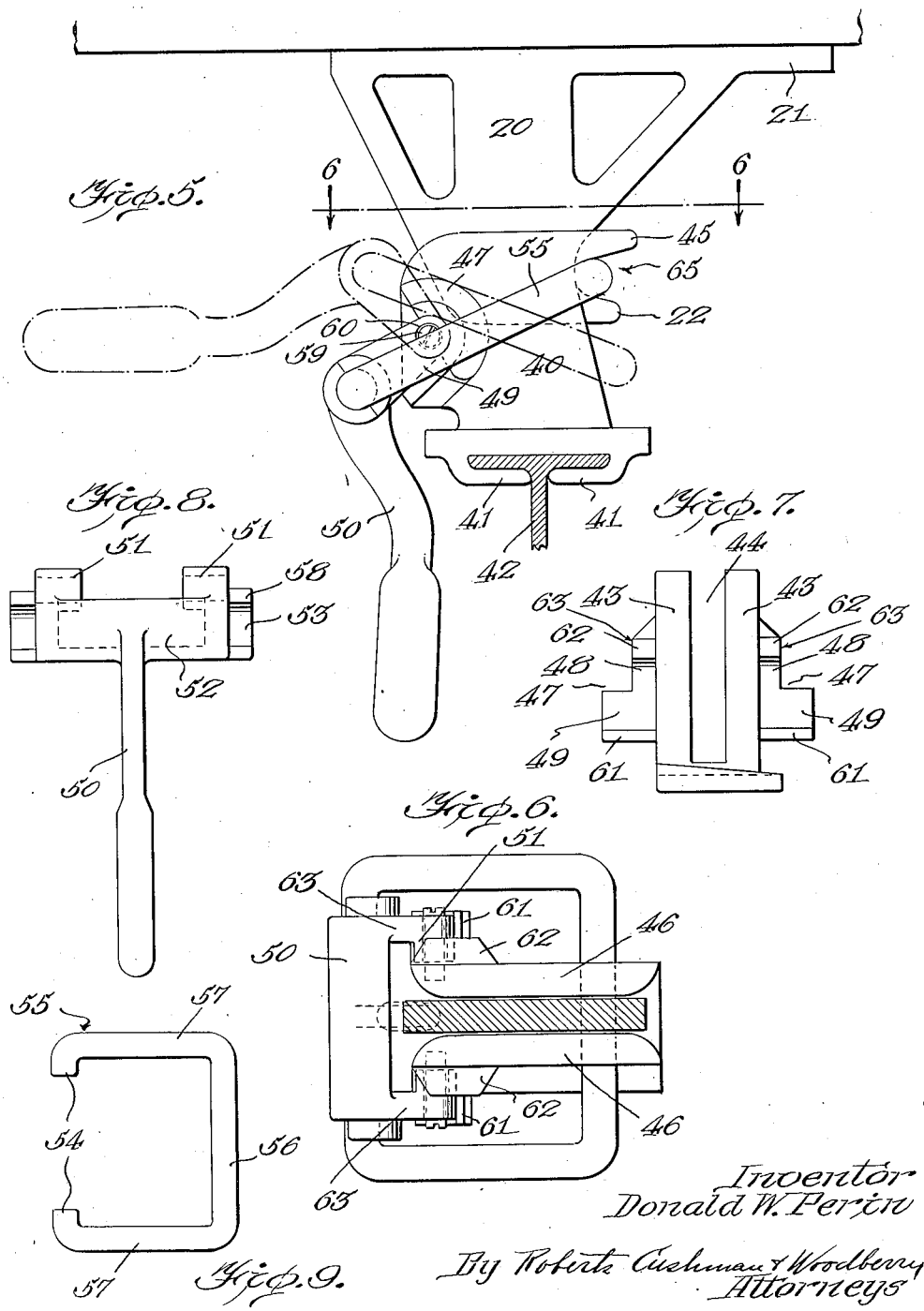

Patented May 12, 1931

1,804,542

UNITED STATES PATENT OFFICE

DONALD W. PERIN, OF BROOKLINE, MASSACHUSETTS, ASSIGNOR TO AMERICAN FREIGHT SERVICE, INC., OF NEW YORK, N. Y., A CORPORATION OF DELAWARE

LOCKING MEANS

Application filed November 11, 1927. Serial No. 232,589.

This invention relates to an improvement in locking means by which a movable container is rigidly but releasably secured upon a platform.

One object of this invention is to provide locking means which secure the container adjacent each end against any movement of translation or any upward movement relative to the platform, the means being such that they will function regardless of which end of the container is forward.

A further object of this invention is to provide locking means which function with a wedging action to lock the container in place and thus ensure the proper mounting of the container.

Another object of this invention is to provide locking means comprising members fixed upon a container each member having a projecting tongue and members fixed upon the platform which engage said tongues and prevent any upward movement of the container, said platform members being slotted to receive said container members.

Other objects of this invention will appear from an examination of the following description and of the accompanying drawings which disclose the one embodiment of this invention as applied to the securement of a container upon truck chassis and in which Fig. 1 is a side elevation of a truck chassis on which is mounted a container, the container being locked on the chassis by means embodying this invention;

Fig. 5 is an enlarged side elevation of the members by which the rear end of the container is locked on the chassis, showing in full lines the locking position and in dotted lines the releasing position;

Fig. 6 is a sectional view taken along the line 6—6 of Fig. 5;

Fig. 7 is an end elevation of the rear locking element which is rigidly secured to the chassis;

Fig. 8 is an end elevation of one element of the locking means shown in Fig. 5; and Fig. 9 is a view of another element of such means.

Figure 1:
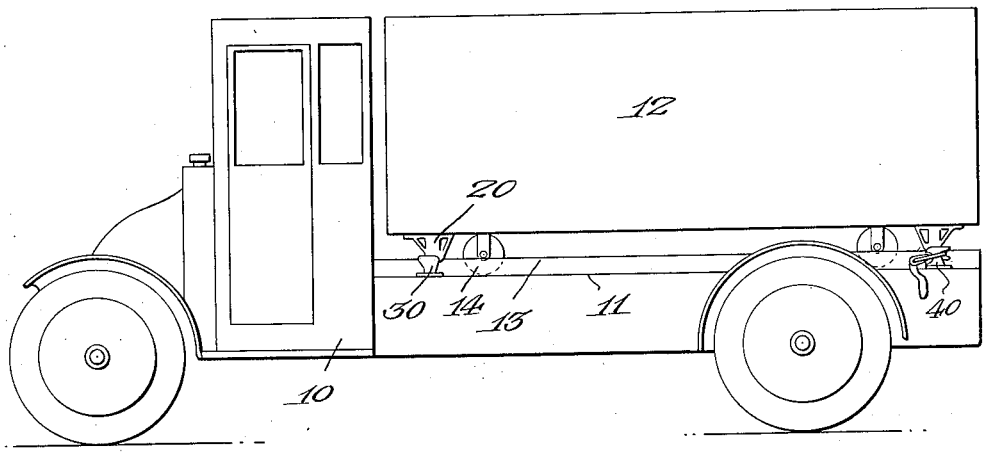

In Fig. 1 is shown a truck 10 upon the chassis 11 of which is mounted a movable container 12. Upon the upper surface of the chassis 11 are parallel tracks 13 with which casters 14 carried by the body 12 engage when the body is assembled on the truck. The container is assembled on the chassis in the manner disclosed in my Patent No. 1,418,966, dated June 6, 1922, and since no novelty resides in this feature, it will not be described herein in detail. The object of this invention, as was pointed out above, is to provide means for locking the container 12 upon the chassis 11 so that, when the container is in the position on the chassis shown in Fig. 1, any movement of the container either forwardly, backwardly or upwardly will be prevented.

Depending from the base of the container 12 adjacent each corner are members 20 secured to the container in any suitable way, as by means of bolts passed through flanges 21. The members 20 are arranged in pairs one pair at each end and each member is provided with a tongue 22. As shown in the drawings the tongues of each pair of members extend in the same direction toward the adjacent end of the container. Referring to Fig. 1 the tongues of the forward pair extend toward the front of the truck and those of the rearward pair of members extend toward the back of the truck. Inasmuch as the tongues of the members 20 on the same side of the container extend in opposite directions, it is obvious that turning the container around will not in any way interfere with the operation of the locking devices.

Figure 2:
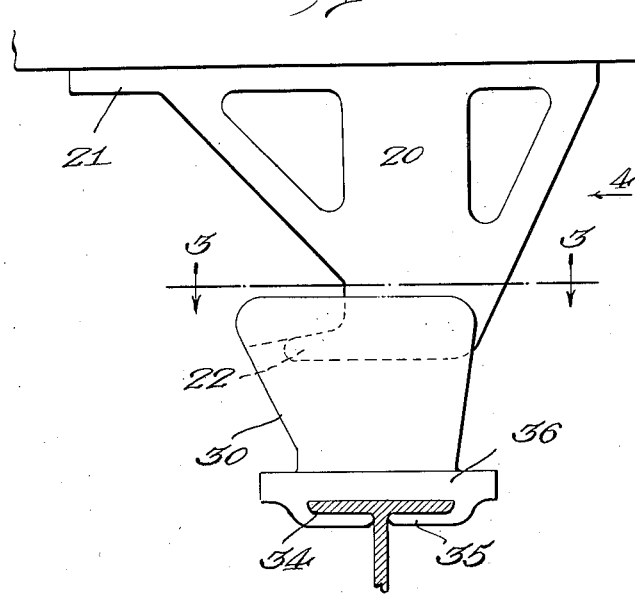
Fig. 2 is an enlarged side elevation of the members by which the front end of the container is locked on the chassis showing them in the locking positions.
Figure 4:
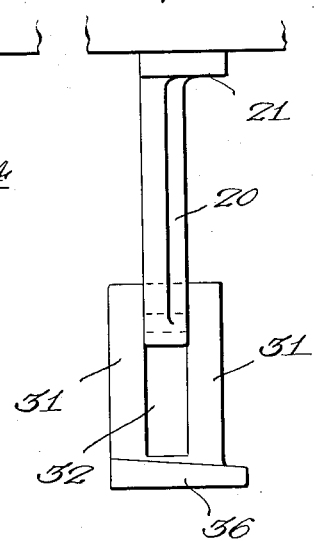
Fig. 4 is an end elevation taken in the direction of the arrow 4 of Fig. 2.
Figure 3:
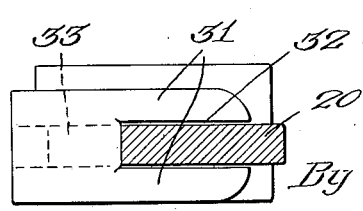
Fig. 3 is a sectional view taken along the line 3—3 of Fig. 2.

Rigidly mounted upon the chassis 11 near the forward end thereof are members 30, one on each side, with which one pair of the members 20 on the container 12 will engage when the container is in the desired position. Each member 30, as shown particularly in Figs. 3 and 4, includes a pair of uprights 31 defining a slot 32 connected at the forward end by an integral crosspiece 33. The contour of the lower face of the crosspiece 33 and the contour of the upper face of the tongue 22 are such that when the member 20 is in engagement with the member 30 the tongue 22 will snugly engage the crosspiece 33. The members 30 are here shown (Fig. 2) as mounted upon a transversely extending I-beam 34 of the chassis and secured thereto by means of flanges 35 which engage the head of the beam. If desired the members 30 may also be secured to the chassis by screws or bolts passed through the base 36.

Fixed on the chassis 11 near the rear end thereof in a position such that the second pair of members 20 will engage them when the container is mounted upon the chassis, are members 40 suitably secured to the truck as, for instance, by means of flanges 41 which engage the head of an I-beam 42 (see Fig. 5) and screws or bolts through the base of the members 40. Each of the members 40, like the members 30, comprise a pair of uprights 43 suitably spaced from each other to define a slot 44 through which the members 20 may pass. Each member 40 terminates in a rearwardly extending tongue 45 which, as is shown in Fig. 6, is formed by a pair of members 46 projecting from the uprights 43. From the outer face of each upright 43 projects a socket 47, the interior of which comprises a curved portion 48 and a plane portion 49 which merges with the portion 48 at one edge thereof.

Pivotally mounted upon the member 40 is a handle 50 provided with a pair of opposed bosses 51 spaced from and parallel to a body portion. The outer contour of the bosses 51 is such that they will enter the interior of the sockets 47 and will coincide with the curved portion 48 thereof. At each end of the body portion 52 of the handle 50 are provided curved sockets 53 which receive the ends 54 of a bail 55. The bail 55, as shown in Fig. 9, comprises a center section 56 spaced from and parallel to the end sections 54 and a pair of side sections 57, which join the section 56 to the end sections 54. The members 54, 56 and 57 are preferably integral, as shown in the drawing, although they could be of separate parts joined together if desired. The socket 53 preferably is formed by a semi-circular flange 58 and the ends 54 of the bail 55 can easily be inserted into the sockets in assembling the parts.

The handle 50 is preferably secured to the support 40 by means of screws 59 which pass through holes 60 in the bosses 51 and enter the uprights 43 of the member 40. It will be obvious that the diameter of the screws 59 is appreciably smaller than the diameter of the holes 60 through the bosses 51, thus ensuring that when the handle is turned the bosses 51 will contact with the surface 48 of the sockets 47. The sockets 47 are defined by walls 63 having a section in 61 which forms the plane portion 49, and a section 62 which forms the curve portion 48. The sections 61 extend from the uprights 43 beyond the sections 62 and thus act to limit the movement of the handle 50 in one direction by engaging the arms of the body portion 52 from which the busses 51 project.

When the body 12 is being mounted upon the chassis 11 the casters 14 rolling in the tracks 13 guide the container so that the forward pair of members 20 pass through the slots 44 between the uprights 43 of the members 40 and enter the slots 32 between the uprights 31 of the members 30. The crosspieces 33 prevent any forward movement of translation of the container by engaging the forward edges of the members 20 and also prevent any upward movement of the container relative to the chassis by their engagement with the tongues 22. When the forward pair of members 20 are in this position in the members 30 the rearward pair of members 20 will be within the slots 44 of the members 40. The tongue 22 of the member 20 will be below and separated from the tongue 45 of the member 40 by a space 65 which due to the taper of the tongues will be substantially V-shaped. At the time the container is being loaded upon the truck the handles 50 are preferably in the full line position shown in Fig. 5, which position they will assume under the force of gravity, while the bails 55 will be resting against the bases of the members 40 or against the rear walls thereof and will not in any way interfere with the passage of the members 20 through the members 40.

The container being in the desired position on the truck, the handle 50 is first raised to the dotted line position shown in Fig. 5. The bail 55 is then raised into a position in front of the space 65 between the tongues 22 and 45. The handle 50 is then swung downwardly in the sockets 47, thus forcing the bail 55 to enter the space 65, and in case the container is not fully down on the truck chassis, separating the tongues 22 and 45 until it reaches the full line position shown against the rear edge of the member 20 on Fig. 5. It will be noted that when this position is reached, the side sections 57 of the bail extend from the sockets 53 on the handle to the space 65 below the sockets 47 so that the bail will be locked in the position shown in Fig. 5. The section 56 of the bail thus engages the rear edge of the member 20 on the container and also rests upon the upper face of the tongue 22, being wedged into the space 65 between the tongues 22 and 45 so that the bails 55 hold the container against any movement either backwardly or upwardly.

From the above description it will be apparent that when the container is locked on the chassis in accordance with this invention, it is prevented from any further forward movement of translation by means of the members 30 and is prevented from any backward movement of translation by means of the members 40. In addition the members 30 prevent any upward movement on the front of the container while the members 40 prevent any upward movement of the rear of the container. When the truck has reached its destination, the handles 50 are raised into the dotted line position shown in Fig. 5 and the bails 55 are free to drop, releasing the rearward pair of members 20. After the bails 55 have left the spaces 65, the handles 50 are allowed to drop back into the full line position shown in Fig. 5 and the container can be rolled off the chassis.

This invention has been shown in the drawings and described in the specification as applied to the locking of a container upon a truck chassis. It will be obvious, however, that the locking means which form the subject of this invention are equally applicable wherever the container is to be fixed. For this reason the term "platform" where used in the claims avoids any limitation of this invention to the particular use with a truck chassis here described.

While one embodiment of this invention has been shown and described I am not limited thereto since it is obvious that other embodiments might be made without departing from the spirit and scope of the invention as set forth in the following claims.

I claim:

1. Means for locking a removable container upon a platform including a slotted member fixed upon said platform, a second member fixed upon said container and adapted, when said container is in the desired position upon said platform, to enter the slot in said platform member, a tongue on said container member and a bail carried by said platform member which engages said tongue and prevents any upward movement of said container relative to said platform or any movement of translation of the container over the platform in one direction.

2. Means for locking a removable container upon a platform, said container being movable translatorily over said platform including a slotted member fixed upon said platform, a second member fixed upon said container and adapted, when said container is moved over the platform into the desired position upon said platform, to enter the slot in said platform member, a tongue on said container member and a bail pivotally supported by said platform member which may be swung into engagement with said tongue to prevent any upward movement of said container relative to said platform.

3. Means for locking a removable container upon a platform, said container being movable translatorily over said platform including a slotted member fixed upon said platform, a second member fixed upon said container and adapted, when said container is moved over the platform into the desired position upon said platform, to enter the slot in said platform member, a tongue on said container member and a bail pivotally supported by said platform member which may be swung into engagement with said container member to prevent any movement of translation of said container relative to said platform in one direction.

4. Means for locking a removable container upon a platform, said container being movable translatorily over said platform including a slotted member fixed upon said platform, a second member fixed upon said container and adapted, when said container is moved over the platform into the desired position upon said platform, to enter the slot in said platform member, a tongue on said container member, a bail carried by said platform member which engages said tongue, and means for forcing said bail into engagement with said tongue to prevent any upward movement of said container relative to said platform.

5. Means for locking a removable container upon a platform, said container being movable translatorily over said platform including a slotted member fixed upon said platform, a second member fixed upon said container and adapted, when said container is moved over the platform into the desired position upon said platform, to enter the slot in said platform member, a tongue on said container member, a pivoted bail carried by said platform member which may be swung into engagement with said tongue to prevent movement of translation of the container in one direction, and means for forcing said bail into engagement with said tongue to prevent any upward movement of said container relative to said platform.

6. Means for locking a removable container upon a platform, said container being movable translatorily over said platform including a slotted member fixed upon said platform, a second member fixed upon said container and adapted, when said container is moved over the platform into the desired position upon said platform, to enter the slot in said platform member, a tongue on said container member, a pivoted bail carried by said platform member which may be swung into engagement with said tongue to prevent movement of translation of the container in one direction and means pivoted upon said platform member and upon which means said bail is pivoted for forcing said bail into engagement with said tongue to prevent any upward movement of said container relative to said platform.

7. Means for locking a removable container upon a platform said container being movable translatorily over said platform including a slotted member fixed upon said platform, a second member fixed upon said container and adapted, when said container is moved over the platform into the desired position upon said platform, to enter the slot in said platform member, a tongue on said container member, a tongue on said platform member spaced from the tongue on said container member when the container is in said position, and means engaging both said tongues to prevent upward movement of said container relative to said platform.

8. Means for locking a removable container upon a platform said container being movable translatorily over said platform including a slotted member fixed upon said platform, a second member fixed upon said container and adapted, when said container is moved over the platform into the desired position upon said platform, to enter the slot in said platform member, a tongue on said container member, a tongue on said platform member spaced from the tongue on said container member when the container is in said position, and wedging means for separating said tongues.

9. Means for locking a removable container upon a platform including a slotted member fixed upon said platform, a second member fixed upon said container and adapted, when said container is in the desired position upon said platform, to enter the slot in said platform member, a tongue on said container member, a tongue on said platform member spaced from the tongue on said container member when the container is in said position, and a bail carried by said platform member adapted to be introduced into the space between said tongues when said container is in the desired position.

10. Means for locking a removable container upon a platform including a slotted member fixed upon said platform, a second member fixed upon said container and adapted, when said container is in the desired position upon said platform, to enter the slot in said platform member, a tongue on said container member, a tongue on said platform member spaced from the tongue on said container member when the container is in said position, a handle carried by said platform member, and a bail carried by said handle adapted to be introduced into the space between said tongues, said handle acting upon said bail to separate said tongues by a wedging action.

11. Means for locking a removable container upon a platform including a slotted member fixed upon said platform, a second member fixed upon said container and adapted, when said container is in the desired position upon said platform, to enter the slot in said platform member, a tongue on said container member, a tongue on said platform member spaced from the tongue on said container member when the container is in said position, a handle pivoted upon said platform member, and a bail pivoted upon said handle adapted to be introduced into the space between said tongues, said handle acting upon said bail to separate said tongues by a wedging action.

12. Means for locking a removable container upon a platform including a member rigidly fixed upon said platform and having spaced uprights, a second member fixed upon said container and adapted, when said container is in the desired position upon said platform, to enter the space between the uprights of said platform member, a tongue on said container member and movable means carried by the uprights of said platform member which in one position engage said tongue and prevent movement of said container in two directions, and in another position permit free movement of the container in either direction.

Signed by me at Boston, Massachusetts, this eighth day of November, 1927.

DONALD W. PERIN.